United States Patent [19]
Koyama et al.

[11] Patent Number: 5,039,202
[45] Date of Patent: Aug. 13, 1991

[54] OPTICAL SYSTEM DRIVING APPARATUS

[75] Inventors: Osamu Koyama, Hachioji; Hideo Nakajima, Hoya; Tohru Tatsuno, Fuchu; Yasuo Nakamura, Iruma, all of Japan

[73] Assignees: Canon Kabushiki Kaisha; Canon Denshi Kabushiki Kaisha, both of Tokyo, Japan

[21] Appl. No.: 613,451

[22] Filed: Nov. 14, 1990

Related U.S. Application Data

[63] Continuation of Ser. No. 512,605, Apr. 23, 1990, abandoned, which is a continuation of Ser. No. 232,171, Aug. 15, 1988, abandoned.

[30] Foreign Application Priority Data

Aug. 19, 1987 [JP] Japan .................................. 62-204271

[51] Int. Cl.$^5$ ................................................ G02B 7/02
[52] U.S. Cl. .................................. 359/823; 369/44.11; 359/813
[58] Field of Search ................... 350/255, 247; 369/44, 369/45, 46, 44.11, 44.12, 44.22, 44.32, 228

[56] References Cited

U.S. PATENT DOCUMENTS

| | | | |
|---|---|---|---|
| 4,571,026 | 2/1986 | Maruta | 350/247 |
| 4,679,903 | 7/1987 | Kasahara et al. | 350/247 |
| 4,687,296 | 8/1987 | Terayama et al. | 350/247 |
| 4,796,248 | 1/1989 | Ozaki et al. | 369/45 |
| 4,924,199 | 5/1990 | Hashimoto et al. | 369/44.11 |

FOREIGN PATENT DOCUMENTS 55-153138 11/1980 Japan .

Primary Examiner—Bruce Y. Arnold
Assistant Examiner—Loha Ben
Attorney, Agent, or Firm—Fitzpatrick, Cella, Harper & Scinto

[57] ABSTRACT

An optical system driving arrangement includes an optical system driving body, a support shaft provided on the body, an optical system holding member movably supported by the support shaft, an optical system held by the optical system holding member for directing a light beam supplied from the body to an object to be irradiated, a drive device for moving the optical system holding member relative to the body and at least one constituent of an arrangement for detecting the position of the optical system held by the optical system holding member.

30 Claims, 11 Drawing Sheets

X-X' SECTION

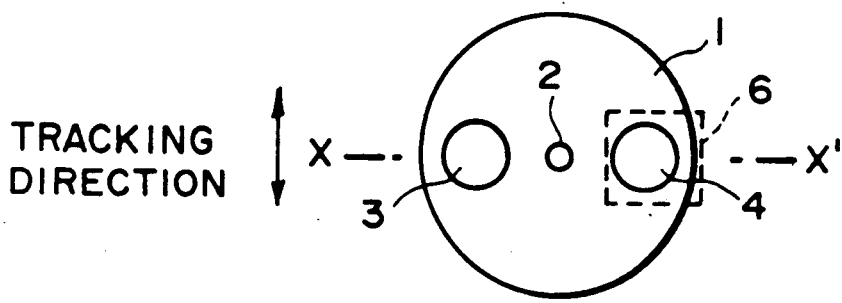
F I G. 5(a)
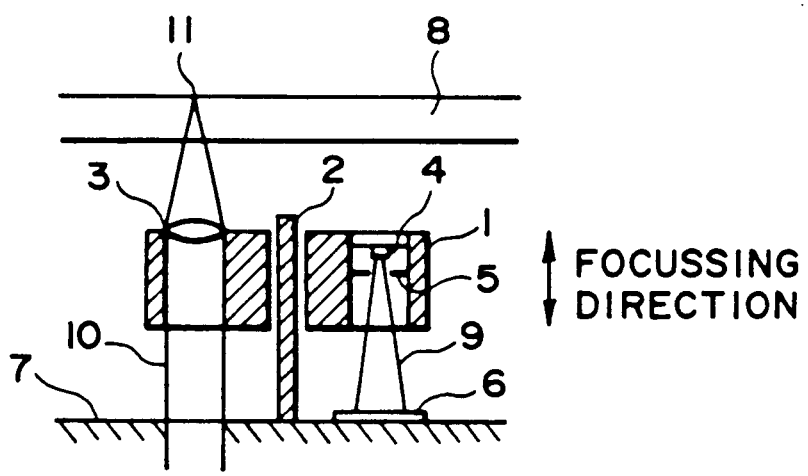
F I G. 5(b)
X-X' SECTION
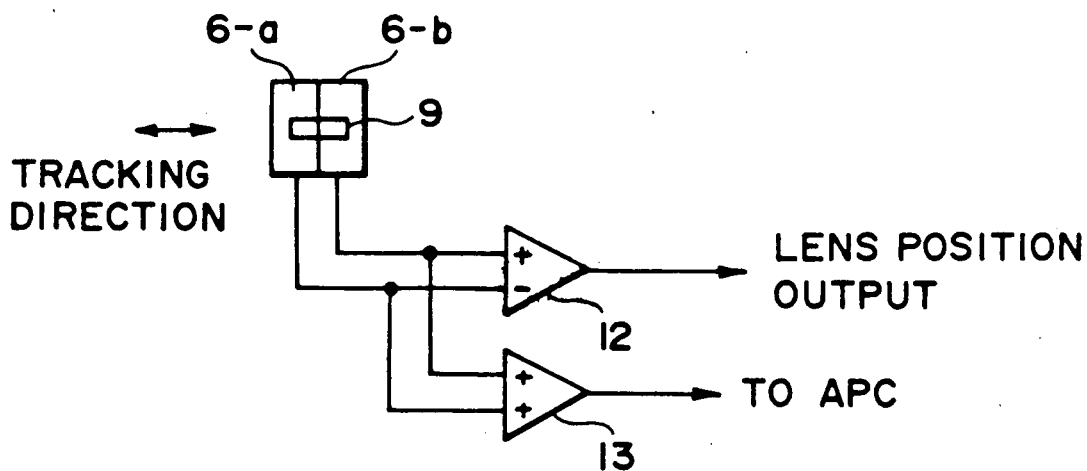
F I G. 5(c)

X-X' SECTION

X-X' SECTION

X-X' SECTION

X-X' SECTION

X-X' SECTION

OPTICAL SYSTEM DRIVING APPARATUS

This application is a continuation of prior application Ser. No. 512,605, filed Apr. 23, 1990, which application is a continuation of prior application Ser. No. 232,171, filed Aug. 151,988, both now abandoned.

BACKGROUND AND SUMMARY OF THE INVENTION

This invention relates to an optical system driving apparatus for moving an optical system by a minute distance. The present invention is suitably used, for example, for the driving of the objective lens of an optical head in an optical information recording-reproducing apparatus.

Optical information recording-reproducing apparatuses for applying a laser beam in the form of a spot onto an information recording medium to thereby record information on the recording medium and/or reproduce the information recorded on the information recording medium have been put into practical use.

Such apparatuses include an optical disc apparatus. The optical disc is such that information tracks comprising rows of information pits having a width on the order of 1-2 μm are formed spirally or concentrically. When reproducing information recorded on the rows of information pits, a laser beam is applied in the form of a minute spot to the information tracks of the optical disc from an optical head while the optical disc is being rotated and the rows of information pits are scanned by the beam spot.

When the reflected light or the transmitted light of the light applied to the surface of the optical disc in this manner is detected by a photo-detector, the optical properties of the light entering the photodetector (for example, the intensity, the angle of polarization, etc. of the light) change depending on whether an information pit exists at the beam spot position. By detecting the changes, a reproduction signal corresponding to a row of information pits can be obtained.

Also, in such an optical disc apparatus, it is very important for the minute spot to always scan the rows of information pits on the recording medium accurately. For this reason, auto focusing for correcting an focus deviation resulting from warp or the like of the recording medium and auto tracking for correcting any deviation of application by eccentricity or the like of the recording medium become necessary.

FIG. 1 of the accompanying drawings is a perspective view showing an optical system driving apparatus according to the prior art described in U.S. application Ser. No. 922,855 (filed on Oct. 24, 1986) now abandoned. As shown in FIG. 1, an objective lens holding member 128 is inserted in a support shaft 126 fixed to a base bed 121 as by press-in, through a bearing, and an objective lens 123 and a weight 129 substantially equal in weight to the objective lens 123 are mounted near the support shaft 126. Further, a neutral point holding member, not shown, is mounted below the weight 129. A coil 124 for focusing is wound on the outer periphery of the objective lens holding member 128, and a coil 125b for tracking and a coil 125a for tracking, not shown (which is mounted at the position opposite to the coil 125b for tracking with respect to the support shaft 126) are further mounted on the coil 124 for focusing. Permanent magnets 127a and 127b for focusing having opposed magnetic poles formed near the outer peripheral portion and the inner peripheral portion of the objective lens holding member 128 are secured to the base bed 121, so as to be opposed to the coil 124 for focusing, and permanent magnets 122a and 122b for tracking are secured near the outer peripheral portion of the objective lens holding member 128 so as to be opposed to the coils 125a and 125b for tracking. The objective lens holding member 128 is vertically slid and clockwisely and counterclockwisely rotated by an electromagnetic force produced by an electric current flowing to the coil 124 for focusing and the coils 125a, 125b for tracking and a magnetic field formed for each coil.

An optical system driving apparatus has been constituted by attaching to the optical head body by means of screws, the base bed 121 to which the permanent magnets 122a, 122b for tracking, the permanent magnets 127a, 127b for focusing and the support shaft 126 are secured. The optical system driving apparatus as shown in FIG. 1 wherein the objective lens holding member is clockwisely and counter-clockwisely rotated about the support shaft is disclosed in U.S. Pat. No. 4,467,463, U.S. Pat. No. 4,566,089, U.S. Pat. No. 4,571,026, U.S. Pat. No. 4,643,522, and U.S. Pat. No. 4,687,296, for example.

Also, generally in a DRAW (direct read after write) type or type optical disc apparatus, spiral guide grooves for tracking are provided in advance on the optical disc. The pitch of the guide grooves is very small, say, on the order of 1 μm, and therefore, when a light spot is applied thereto, diffraction occurs and the diffracted light is scattered in a direction perpendicular to the tracks. In a push-pull type tracking apparatus, a variation in light and shade of the patterns of O-order and ±1st-order diffracted light beams on a detector for tracking are taken out as a tracking error signal and objective lens servo is effected.

In an optical disc apparatus wherein an objective lens for condensing a minute spot on a predetermined track is moved relative to a detector for tracking to thereby accomplish tracking servo, the presence of great eccentricity of the disc causes the center on the detector to move. Offset to a tracking error signal occurs and thus, it is difficult to accomplish accurate tracking.

This will now be described briefly with reference to FIG. 2 of the accompanying drawings.

FIG. 2 shows a portion of an optical disc apparatus, and more specifically, it shows a portion necessary to effect tracking servo.

In FIG. 2, a light beam 10 from a semiconductor laser (not shown) is condensed on a predetermined track on a disc 8 having tracking guide grooves (not shown) by an objective lens 3. The objective lens 3 follows the track in the tracking direction with the aid of an actuator (not shown) with the eccentricity of the disc. When the eccentricity of the disc 8 is very small, the optic axis of the objective lens 3 is substantially coincident with the center of the light beam 10 from the laser, and a diffracted light beam including the asymmetry of ±1st-order diffracted light beamed corresponding to the positional deviation between the track and the spot again enters the objective lens 3. This diffracted light beam passes through the objective lens 3, whereafter it is reflected by a half-mirror 15 and arrives at two-division detectors 14a and 14b. The spots on the detectors 14a and 14b, as shown in FIG. 3(b) of the accompanying drawings, are positioned symmetrically with respect to the dividing line, and a tracking error signal is produced by the asymmetry of the ±1st-order diffracted light beams on the detectors 14a and 14b.

If the disc 8 is eccentric by a distance D, the objective lens 3 pursues it and therefore, the light beam from the laser enters the objective lens with the center of the former being deviated from the center of the latter by the distance D. Along therewith, the spots on the detectors enter asymmetrically with respect to the dividing line as shown in FIG. 3(a) or 3(c) of the accompanying drawings and therefore, the differential output of the detectors 14a and 14b causes an offset δ as shown in FIG. 4(a) or 4(c) of the accompanying drawings. If servo is effected in accordance with a tracking error signal which has caused the offset δ, it becomes impossible to confine the beam spot 11 rightly onto the track and it becomes difficult to accurately record or reproduce information.

An example for solving this problem is disclosed in U.S. application Ser. No. 041,348 (filed on Apr. 22, 1987) now Pat. No. 4,853,917. The design is such that in an optical system driving apparatus provided with a light source, an objective lens for condensing the light beam from the light source as a minute spot on a track of a recording medium, and means for moving the objective lens in the tracking direction perpendicular to the track, at least one photoelectric conversion element movable with the objective lens is provided outside of the effective diameter of the objective lens and a part of the light beam from the light source is directly received by the photoelectric conversion element to thereby detect the position of the objective lens in the tracking direction.

However, in the above-described optical system driving apparatus, the objective lens position output is obtained from the marginal portion of the light beam from the light source and therefore, it has been difficult to obtain an output of a desired level. Also, when the distribution of the light beam from the light source is not laterally symmetrical with respect to the optic axis up to the marginal portion of the light beam, it becomes likewise difficult to detect the position of the objective lens in the tracking direction.

In view of the above-noted problems peculiar to the above-described apparatus, the present invention has as its object the provision of an optical system driving apparatus which can accurately detect the position of an optical system such as an objective lens.

The above object is achieved by an optical system driving apparatus provided with a rotatable type optical system holding member having an optical system such as an objective lens system in a portion thereof, a shaft for supporting the movement of the holding member, and a base bed to which the shaft is fixed, characterized in that a constituent of means for detecting the position in the direction of rotation is provided in a portion of the rotatable type optical system holding member.

BRIEF DESCRIPTION OF THE DRAWINGS

FIGS. 5(a), 5(b) and 5(c) show a first embodiment of the optical system driving apparatus of the present invention.

DESCRIPTION OF THE PREFERRED EMBODIMENTS

Figure 1:
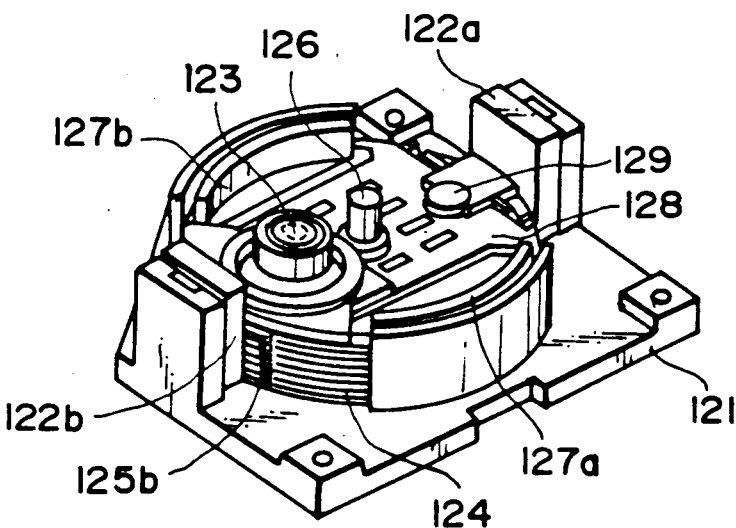
FIG. 1 is a perspective view showing an optical system driving apparatus according to the prior art.
Figure 2:
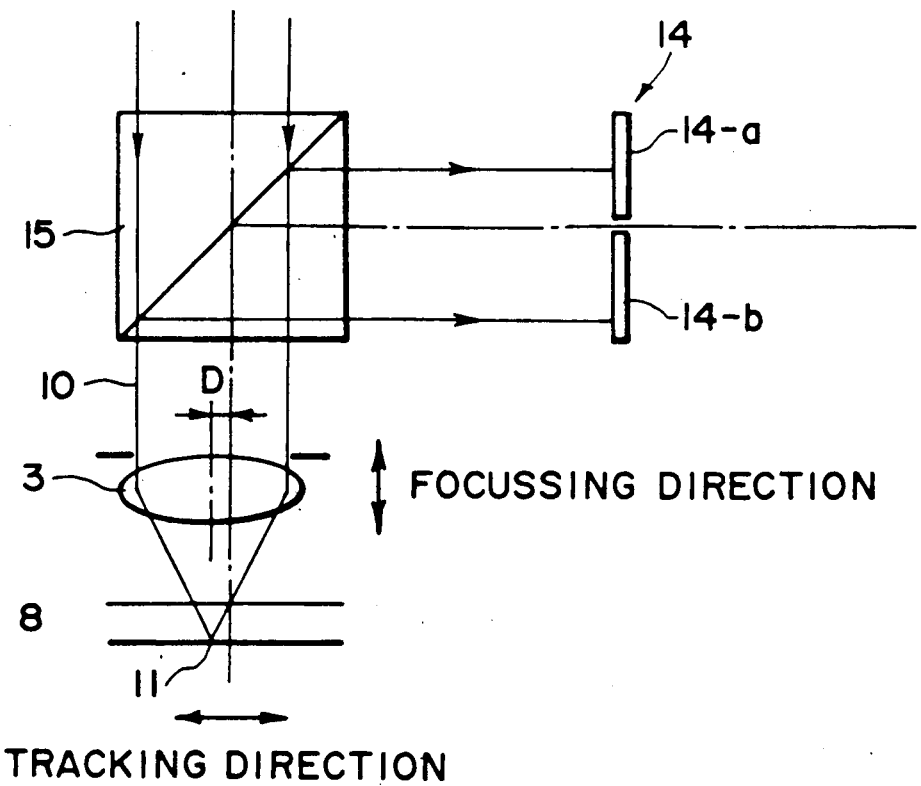
FIGS. 2, 3(a), 3(b), 3(c), 4(a), 4(b) and 4(c) illustrate the problems to be solved by the present invention.
Figures 3A, 3B, 3C:
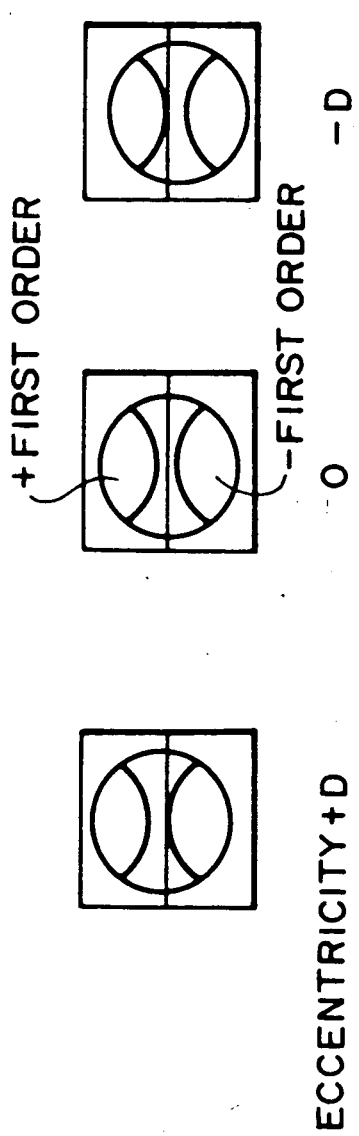
Figures 4A, 4B, 4C:
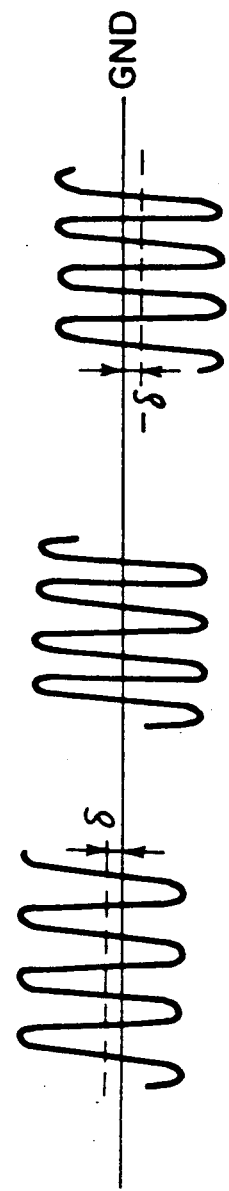

The optical system driving apparatus of the present invention will hereinafter be described in detail with reference to the drawings.

FIGS. 5(a), (b) and (c) show a first embodiment of the optical system driving apparatus of the present invention, FIG. 5(a) being a front view of the embodiment, FIG. 5(b) being a crosssectional view taken along line X—X' in FIG. 5(a), and FIG. 5(c) being a diagram of an electric circuit for obtaining an objective lens position signal.

In FIGS. 5(a) and 5(b), the reference numeral 1 designates an objective lens holding member of a cylindrical construction which is provided at the central portion thereof with a hole for passing a shaft therethrough and is further provided with a hole for fixing therein an objective lens to be described and a hole for fixing therein an objective lens position detecting optical system. The objective lens holding member 1 is usually formed of a carbon fiber-consolidated resin material, and may be rotated and slid by a magnetic circuit comprised of a magnet and a coil, not shown. Reference numeral 2 denotes a shaft which provides the center of rotation and sliding movement of the objective lens holding member 1, and as shown in FIG. 5(b), it is secured to a base bed in such a manner as to extend through the objective lens holding member 1 orthogonally thereto. Reference numeral 3 designates an objective lens system which has the function of condensing a light from a light source, not shown, on the information recording surface of a recording medium.

Reference numeral 4 denotes a light-emitting element such as an LED which is a light source, and reference numeral 5 designates a slit provided correspondingly to the element 4. These are provided at positions symmetrical with the objective lens 3 with respect to the shaft 2. By these being provided at such positions, they function also as a counterweight. Reference numeral 7 denotes an actuator mounting base bed which is an optical system driving apparatus body, and reference numeral 6 designates a two-division light-receiving element which is a light-receiving member secured to the base bed 7. The two-division light-receiving element 6 is divided in a direction orthogonal to the tracking direction of the objective lens system, as shown in FIG. 5(c), and the detectors 6a and 6b thereof have connected thereto a differential amplifier 12 for detecting the lens position and an addition amplifier 13 for detecting the quantity of light of the light-emitting element 4.

Reference numeral 8 denotes a recording medium (for example, an optical disc), reference numeral 9 designates a light beam passing from the light-emitting element 4 to the two-division light-receiving element 6 via the slit 5, reference numeral 10 denotes a light beam from a semiconductor laser for information reproduction (not shown), and reference numeral 11 designates a light beam spot resulting from the light beam 10 being condensed on the information recording surface by the objective lens 3.

Figure 6:
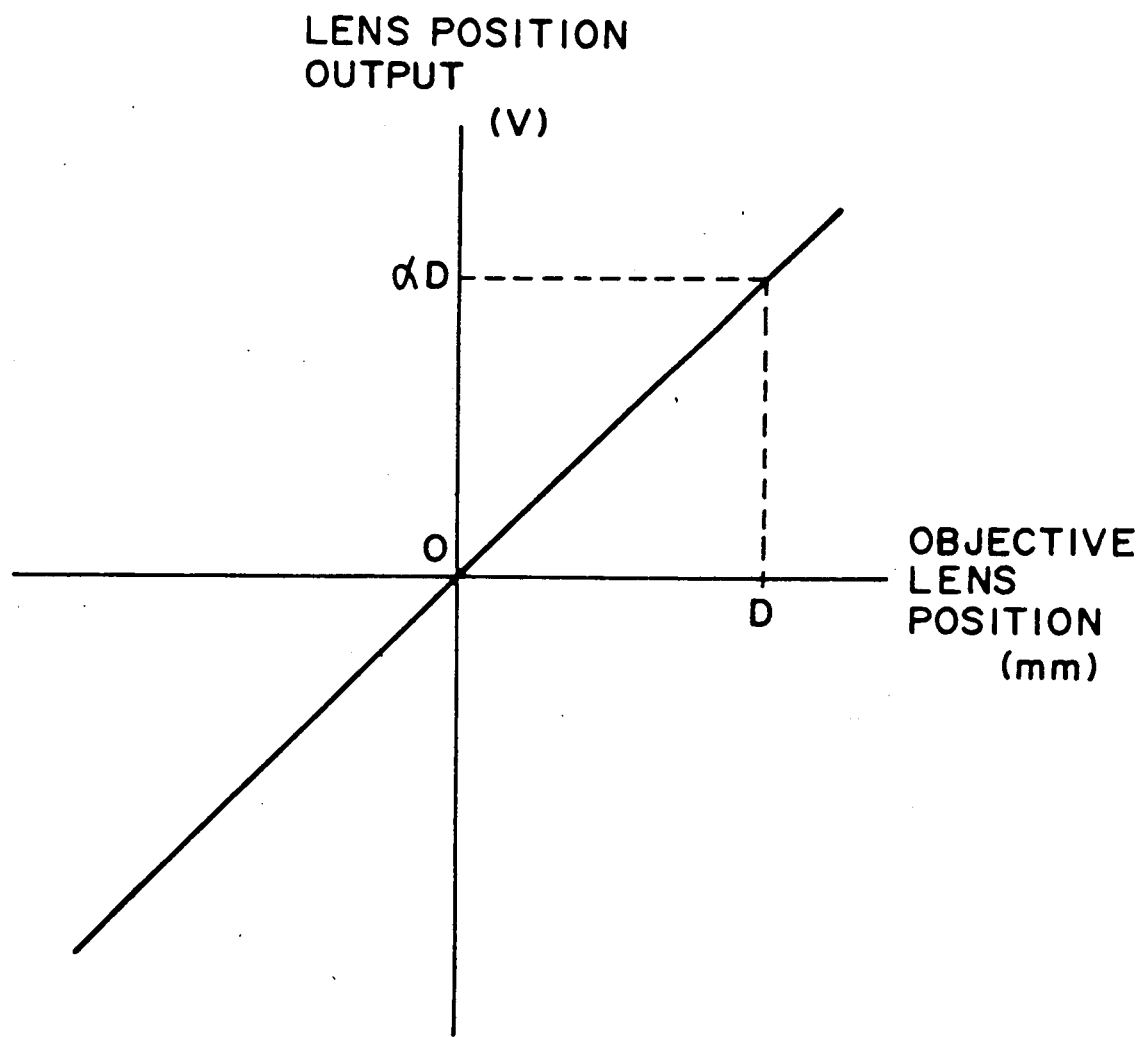
FIG. 6 shows the objective lens position signal output obtained by the present invention.

In the present embodiment, the light-emitting element 4 and the slit 5 for limiting the light beam from the element 4 are disposed instead of the weight 129 in FIG. 1. The light beam from the light-emitting element 4 is shaped into a suitable shape by the slit 5, whereafter it arrives at the two-division detector 6. The detector 6 has a dividing line perpendicular to the tracking direction and therefore, by taking the differential thereof, it is possible to determine the position of the light-emitting element 4 relative to the base bed 7. That is, it is possible to determine the position of the objective lens 3 relative to the base bed 7. That is, when the center of the objective lens 3 and the optic axis of the light beam 10 from the laser coincide with each other (when the eccentricity is 0), if the outputs from the detectors 6a and 6b are adjusted so as to become equal to each other, the spot of the beam 9 on the two-division detector 6 moves and a lens position output (the vertical axis) proportional to the objective lens position (the horizontal axis) as shown in FIG. 6 can be produced when the objective lens becomes eccentric. In the present embodiment, the linearity is improved by making the shape of the slit 5 into a suitable rectangle, but in some cases, the slit 5 may be eliminated.

Also, in the present embodiment, the light-emitting element 4, the slit 5 and the light-receiving element 6 are disposed in series in the focus driving direction and therefore, even if movement of the objective lens holding member 1 in the focusing direction by surface vibration of the disc occurs, influence thereof upon the objective lens position output is small and linearity is improved. Further, the sum output from the detectors 6a and 6b is detected, the quantity of light of the light-emitting element 4 is monitored and APC (auto power control) is effected. Therefore, output fluctuation, for example, by any change in the temperature of the light source can be reduced more and thus, accurate detection of the objective lens position is possible.

Also, in the present embodiment, the sum of the weight of the light-emitting element 4 and slit 5 which form a part of the constituent necessary for the detection of the objective lens position is made substantially equal to the weight of the objective lens 3.

Further, in the present embodiment, the positions of the light-emitting element 4 and slit 5 are substantially symmetrical with the objective lens 3 with respect to the rotatable shaft 2.

According to the above-described embodiment of the present invention, there is provided an optical system driving apparatus in which, with attention to the fact that a counterweight is required at a position substantially symmetrical with the objective lens 3 with respect to the rotatable shaft 2 in order that a rotatable type actuator may secure its dynamic performance, elements necessary for the detection of the objective lens position (such as, for example, the light-emitting element, the slit and the light-receiving element) are used instead of the counterweight.

According to the embodiment of the present invention as described above, (1) the reduction in actuator performance caused by the weights of the members necessary for the detection of the objective lens position which are installed in the objective lens holding member can be minimized, (2) the moment of inertia caused by the members installed for the detection of the objective lens position can be set so that dynamic balance may be readily kept, (3) the members necessary for the detection of the objective lens position are provided as a counterweight and therefore, the optical system driving apparatus can be made compact, and (4) the linearity of the objective lens position output is improved.

Also, by utilizing the objective lens position signal output obtained by the present embodiment, there can be obtained the following effects:

(1) When the objective lens is eccentric and an offset component $\delta$ occurs to the tracking error signal, $\delta$ is proportional to the eccentricity D of the objective lens and therefore, by adding the objective lens position signal to the tracking error signal and offsetting the offset $\delta$, accurate tracking servo becomes possible;

(2) If servo is applied by the objective lens position signal output so that the objective lens position may not be eccentric when the optical system is moved at high speed during a seek operation, draw into a predetermined track can be stably accomplished at the end of the seek operation;

(3) If a semiconductor laser (not shown) fixed to the actuator base bed 7, a half-mirror 15 and a detector 14 for tracking are moved by the use of drive means (not shown) and control is effected on the basis of the objective lens position signal so that the center of the objective lens may coincide with the center of the light beam from the laser and the offset $\delta$ is always decreased, accurate tracking servo becomes possible; and (4) The data of the eccentricity of the disc before the seek operation is started is pre-memorized on the basis of the objective lens position signal, the objective lens is driven on the basis of this data at the end of the seek operation and the relative speed of a track to be drawn in and the objective lens is alleviated, whereby stable draw-in of tracking servo can be accomplished.

Figure 7A:
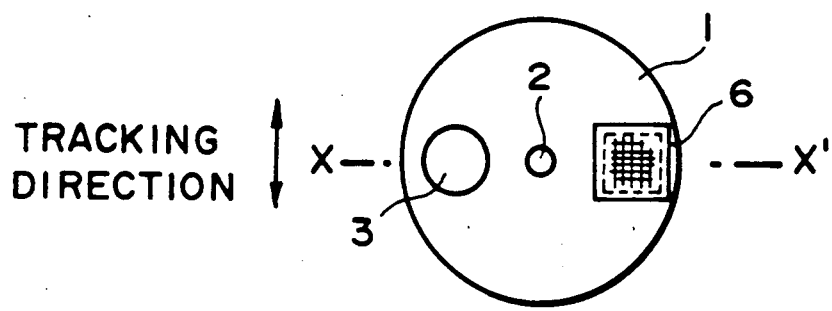
FIGS. 7(a) and 7(b) show a second embodiment of the optical system driving apparatus of the present invention.
Figure 7B:
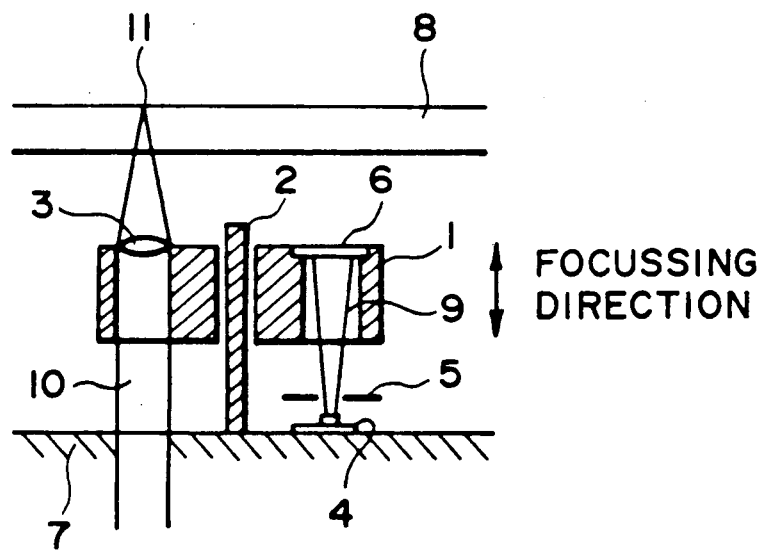

FIGS. 7(a) and (b) show a second embodiment of the present invention. FIG. 7(a) is a front view of the second embodiment and FIG. 7(b) is a cross-sectional view taken along line X—X' in FIG. 7(a). In FIG. 7, members functionally similar to those in the first embodiment are given similar reference numerals.

In the present embodiment, conversely to the first embodiment, the light-emitting element 4 and the opening 5 are mounted on the actuator base bed 7 and the two-division detector 6 is provided in the hole for disposing the objective lens position detecting optical system therein. In this case, the weights of the detector 6 and the objective lens 3 are substantially equal to each other, and the position of the detector 6 is a position substantially symmetrical with the objective lens 3 with respect to the rotatable shaft. The light beam from the light-emitting element 4 fixed to the actuator base bed 7 is shaped into a suitable shape by the opening 5, whereafter it arrives at the two-division detector 6. The two-division detector 6, as in the first embodiment, has a dividing line perpendicular to the tracking direction. Also, if the outputs of the detectors 6a and 6b are adjusted so as to be equal to each other when the center of the objective lens 3 and the optic axis of the light beam 10 from the laser coincide with each other, the spot of the beam 9 on the two-division detector 6 moves when the objective lens becomes eccentric, and an output proportional to the objective lens position is produced.

Figure 8A:
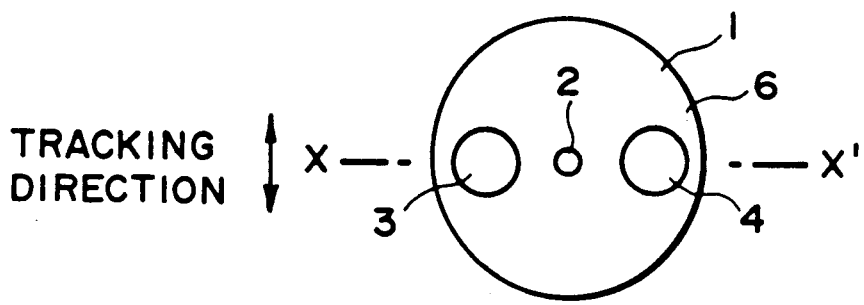
FIGS. 8(a), 8(b) and 8(c) show a third embodiment of the optical system driving apparatus of the present invention.
Figure 8B:
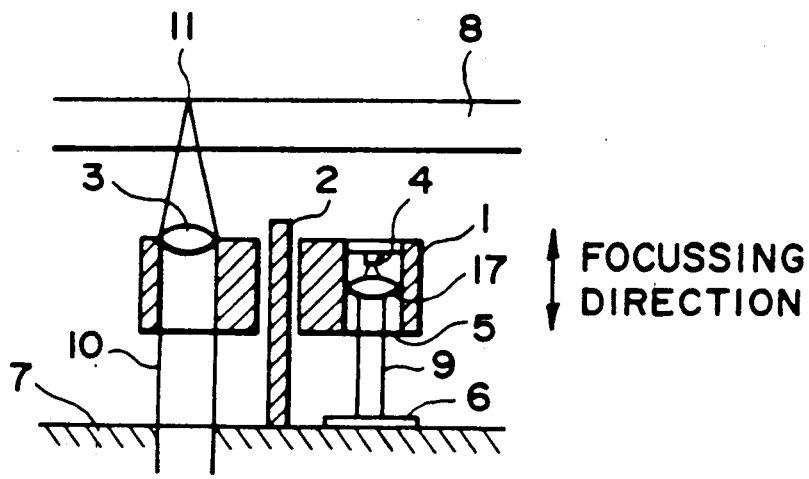
Figure 8C:
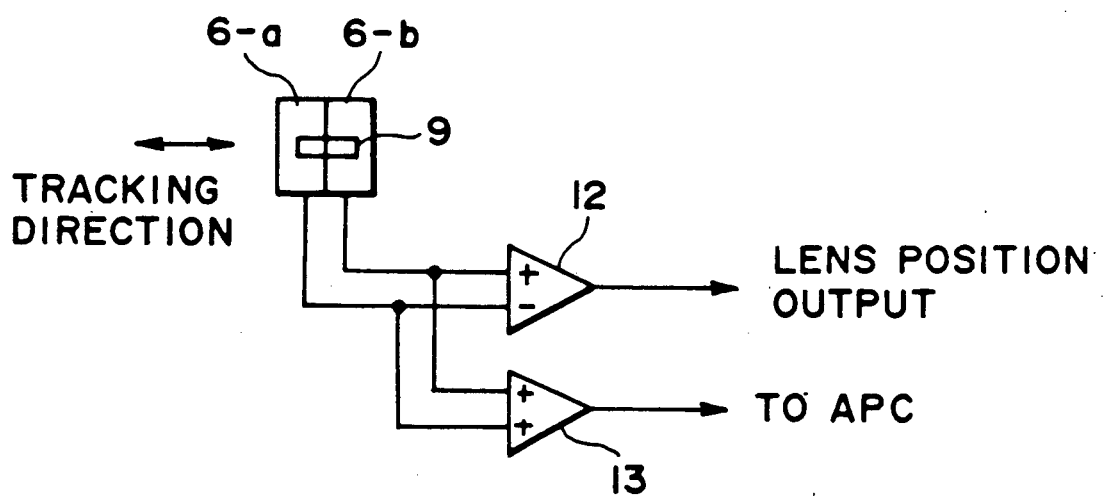

FIGS. 8(a), 8(b) and 8(c) show a third embodiment of the present invention.

The light-emitting element 4 in the embodiment of FIG. 5 is generally an LED, and an LED emits a divergent light beam. In FIG. 8, a collimator lens 17 is added to the objective lens holding member 1. This collimator lens shapes the light beam 9 from the light-emitting element 4 into a parallel light beam. Thereby, the pattern on the light-receiving element 6 becomes clear and the objective lens position output is improved more in linearity. The provision of this collimator lens 17 can likewise be made in the second embodiment of the present invention shown in FIG. 7.

In the embodiment shown in FIG. 8(a), 8(b) and 8(c), the sum of the weights of the light-emitting element 4 and the collimator lens 17 which form a part of the constituent necessary for the detection of the objective lens position is made substantially equal to the weight of the objective lens 3. Also, the positions of the light-emitting element 4 and the collimator lens 17 are substantially symmetrical with the objective lens 3 with respect to the rotatable shaft 2.

Also, in the present invention, the constituent of the means for detecting the objective lens position may be other than optical means.

Figure 9A:
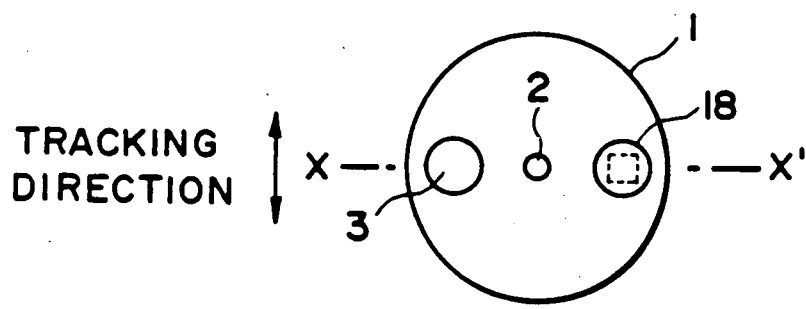
FIGS. 9(a), 9(b) and 9(c) and FIGS. 10(a), 10(b) and 10(c) show fourth and fifth embodiments, respectively, of the optical system driving apparatus of the present invention.
Figure 9B:
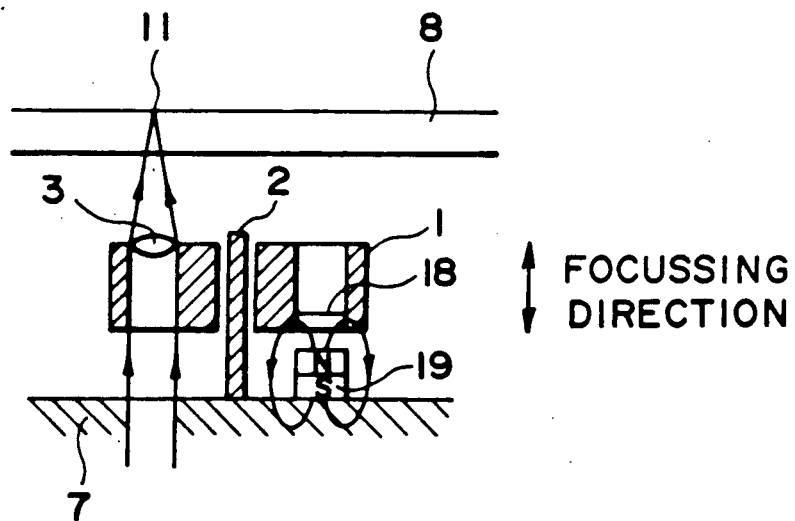
Figure 9C:
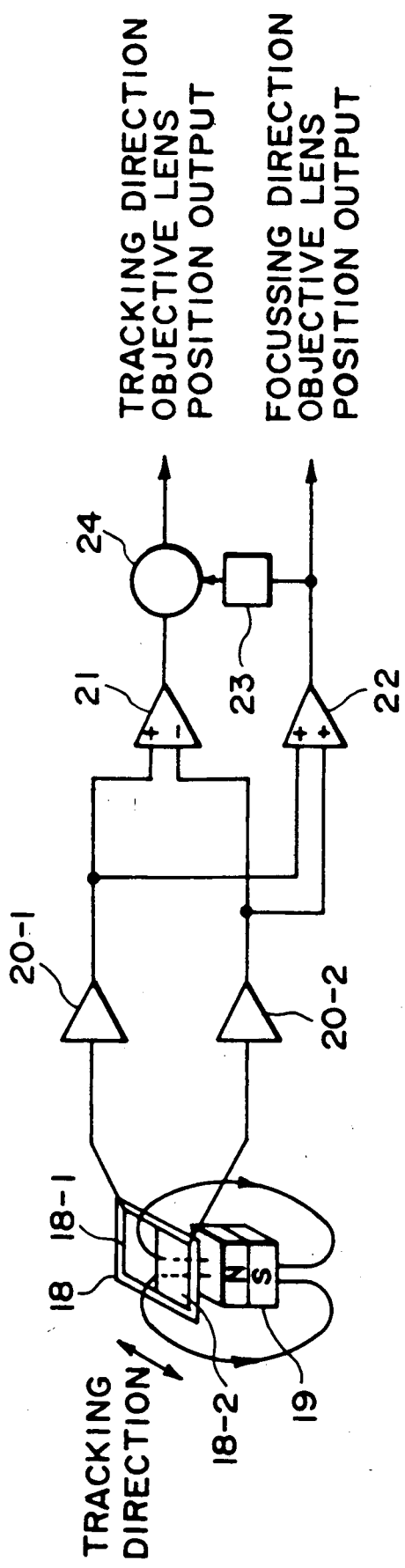

FIGS. 9(a), 9(b) and 9(c) shows a fourth embodiment of the present invention. FIG. 9(a) is a front view of the fourth embodiment, FIG. 9(b) is a cross-sectional view taken along line X—X' in FIG. 9(a), and FIG. 9(c) is a diagram of an electric circuit for obtaining the objective lens position output.

In the present embodiment, a Hall element 18 utilizing the electro-magnetic effect is used for the detection of the objective lens position. The Hall element 18 comprises elements 18-1 and 18-2 arranged in parallel in the tracking direction and is disposed at the counterweight position. Below (in the focusing direction of the dividing line between the elements 18-1 and 18-2, a magnet 19 is disposed on the base bed 7. The Hall elements placed in the magnetic field from the magnet 19 produce equal outputs when the objective lens position is at the central position, and the output of one of the Hall elements increases and the output of the other Hall element decreases when the objective lens position moves in the direction of rotation (the tracking direction). The respective outputs are amplified by amplifiers 20-1 and 20-2, whereafter the objective lens position output as shown in FIG. 6 is obtained in a differential amplifier 21.

In the present embodiment, when the amount of movement of the objective lens 3 in the focusing direction resulting from the surface vibration or the like of the disc 8 is great, the distance between the Hall elements and the magnet varies and an accurate objective lens position output is not obtained. So, the output obtained from the differential amplifier 21 can be normalized in a divider 24 by an output resulting from the output of each Hall element being processed by an adder 22 and a correcting circuit 23. The output from the adder 22, if necessary, can also be used as the focusing direction objective lens position output and therefore, can provide means for preventing collision between the objective lens holding member 1 and the disc 8.

In the embodiment shown in FIG. 9(a) 9(b) and 9(c), the weight of the Hall element 18 which forms a part of the constituent necessary for the detection of the objective lens position is made substantially equal to the weight of the objective lens 3. Also, the position of the Hall element 18 is a position substantially symmetrical with the objective lens 3 with respect to the rotatable shaft 2.

In the present embodiment, the Hall element 18 is disposed at the counterweight position, but this may be on the magnet 19. Also, a construction may be adopted in which the Hall element is disposed in single offset relationship with the magnet and the output when the objective lens position is at the center is the reference and output increases when the objective lens position moves one way and output decreases when the objective lens position moves the other way.

Figure 10C:
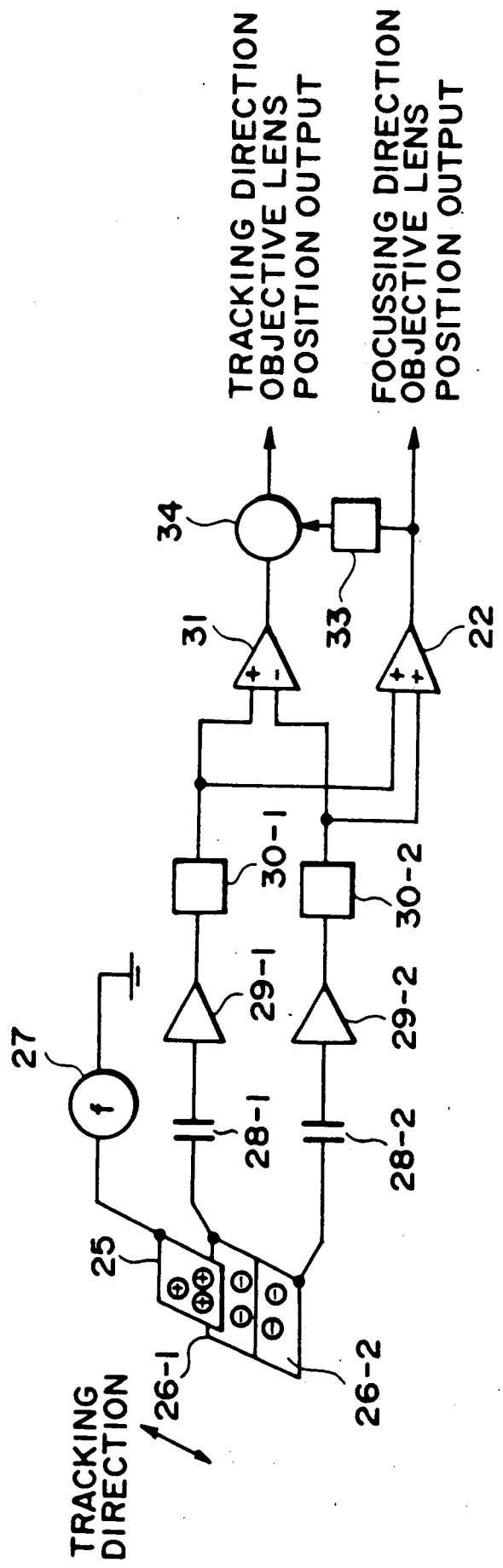
Figure 10A:
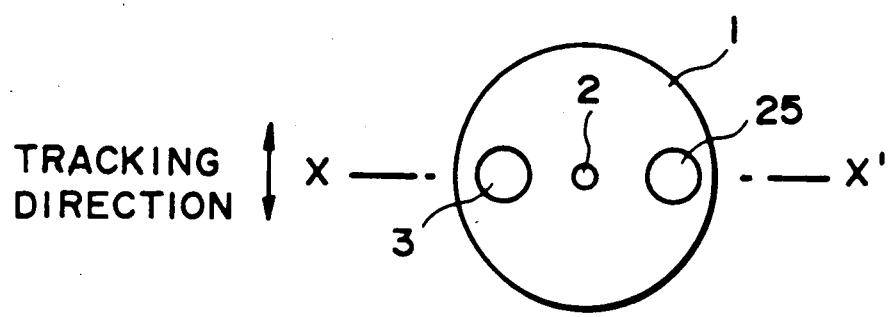
Figure 10B:
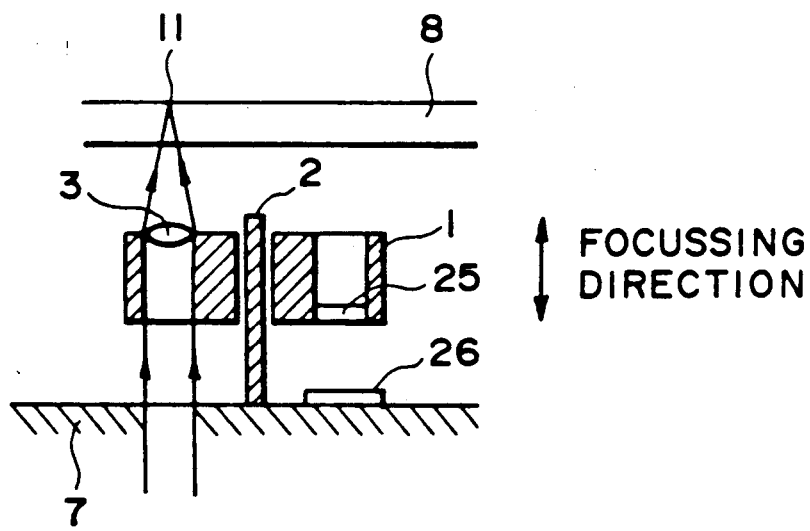

FIGS. 10(a), 10(b) and 10(c) shows a fifth embodiment of the present invention. FIG. 10(a) is a front view of the fifth embodiment, FIG. 10(b) is a cross-sectional view taken along line X—X' in FIG. 10(a), and FIG. 10(c) is a diagram of an electric circuit for obtaining the objective lens position output.

In the present embodiment, a variation in electrostatic capacity is used for the detection of the objective lens position. A metal plate 25 is disposed at the counterweight position of objective lens holding member 1 and forms a capacitor with a similar metal plate 26 disposed on the base bed 7. A high frequency voltage is applied from a high frequency voltage source 27 to the electrode of the metal plate 25, and a high frequency voltage produced in the metal plate 26 by capacity coupling is detected by the use of a capacitor 28, an amplifier 29 and a detecting circuit 30. The metal plate 26 is divided into two parts 26-1 and 26-2 in the tracking direction and insulated, and when the objective lens position is at the central position, the outputs of the detecting circuits 30-1 and 30-2 are equal to each other, and when the objective lens position moves in the direction of rotation (the tracking direction of the objective lens), the output of one of the detecting circuits 30-1 and 30-2 increases and the output of the other detecting circuit decreases. Each output provides the objective lens position output as shown in FIG. 6 by the use of a differential amplifier 31.

Again in the present embodiment, when the amount of movement of the objective lens 3 in the focusing direction resulting from the surface vibration of the disc 8 is great, the distance between the metal plates varies and an accurate objective lens position output is obtained and therefore, correction can be effected as in the fourth embodiment. Reference numeral 32 designates an adder, reference numeral 33 denotes a correcting circuit, and reference numeral 34 designates a divider.

In the present embodiment, the metal plate 26 is divided into two, but a construction may be adopted in which the metal plate 26 is not divided and is disposed in offset relationship with the metal plate 25 and the output when the objective lens position is at the center is the reference and when the objective lens position moves one way, the output increases and when the objective lens position moves the other way, the output decreases.

In the embodiment shown in FIG. 10(a), 10(b) and 10(c), the weight of the metal plate 25 which forms a part of the constituent necessary for the detection of the objective lens position is made substantially equal to the weight of the objective lens 3. Also, the position of the metal plate 25 is substantially symmetrical with the objective lens 3 with respect to the rotatable shaft 2.

The present invention is not restricted to the above-described embodiments, but permits various modifications and applications.

For example, in the above-described embodiments, the objective lens position detecting optical system functions as the counterweight of the objective lens, but of course, the weight and the moment of inertia of the objective lens may be adjusted so that their balance is kept. It is also apparent that this adjustment can be accomplished not only by the constituent of the objective lens position detecting optical system provided in the objective lens holding member 1, but also by the addition of another member (for example, a weight for adjustment).

Figure 11:
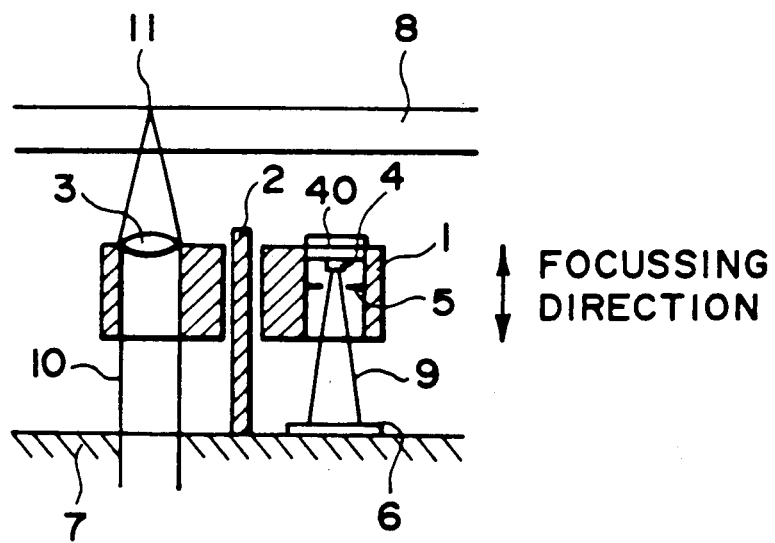
FIG. 11 shows another embodiment of the optical system driving apparatus of the present invention.

That is, for example, as in the first embodiment, an as shown in FIG. 11, a weight 40 for adjustment is provided at a position substantially symmetrical with the objective lens 3 with respect to the rotatable shaft 2. Of course, in this case, the sum of the weights of the light-emitting element 4 and the weight 40 for adjustment is substantially equal to the weight of the objective lens 3. This also holds true in the second to fourth embodiments.

Also, in the first to fifth embodiments, the objective lens position detecting optical system has been shown as being disposed so that the objective lens 3 is substantially symmetrical with respect to the shaft 2, whereas the present invention is not restricted thereto. That is, it is apparent that various patterns are conceivable in the disposition of the optical system if balance is substantially kept in the driving of the optical system in the tracking direction and the focusing direction without any problem arising with respect to accuracy. As also regards its weight, a little difference will not pose a problem if balance is substantially kept.

As described above, according to the optical system driving apparatus of the present invention, the element necessary for the detection of the objective lens position being used instead of a counterweight or as a part of a counterweight in the counterweight portion of the rotatable type actuator leads to the following effects:

(1) The reduction in the actuator performance by the weight of the element necessary for the detection of the objective lens position which is attached to the objective lens holding member can be minimized;

(2) The moment of inertia produced by the element necessary for the detection of the objective lens position which is attached to the objective lens holding member can be rendered ready to keep dynamic balance;

(3) The optical system driving apparatus can be made compact; and (4) The linearity of the objective lens position output can be improved.

According to the present invention as described above, the objective lens position output can be effectively obtained and further, accurate tracking servo becomes possible.

We claim:

1. An optical system driving apparatus for moving, in an optical system comprising a plurality of optical components for directing a light beam to an information recording medium for recording and/or reproducing information, an objective lens relative to the optical components, said optical system driving apparatus comprising:

an optical system driving apparatus body;
a support shaft being supported by said apparatus body;
a lens holder rotatably and movably supported by said support shaft, said lens holder holding the objective lens;
moving means for moving said lens holder relative to said apparatus body;
light source generating means for generating a light beam for detecting a position of the object lens, said light source generating means being installed on said lens holder, and the objective lens and said light source generating means being substantially symmetrically arranged relative to said support shaft; and
a light receiving member for receiving the light beam generated by said light source generating means, said light receiving member being installed on said apparatus body.

2. An optical system driving apparatus according to claim 1, further comprising a compensating weight for compensating a difference in weight between the objective lens and said light source generating means, said lens holder holding said compensating weight.

3. An optical system driving apparatus according to claim 1, further comprising shaping means for shaping the light beam generated by said light source generating means, said lens holder holding said shaping means.

4. An optical system driving apparatus according to claim 3, wherein the objective lens and said light source generating means are substantially symmetrically arranged relative to said support shaft and wherein the objective lens and said shaping means are substantially symmetrically arranged relative to said support shaft.

5. An optical system driving apparatus according to claim 3, wherein a sum of the weight of said light source generating means and said shaping means substantially equals the weight of the objective lens.

6. An optical system driving apparatus according to claim 3, further comprising a compensating weight for compensating a difference in weight between a sum of the weight of said light source generating means, said shaping means and said objective lens, said lens holder holding said compensating weight.

7. An optical system driving apparatus for moving, in an optical system comprising a plurality of optical components for directing a light beam to an information recording medium for recording and/or reproducing information, an objective lens relative to the optical components, said optical system driving apparatus comprising:

an optical system driving apparatus body;
a support shaft being supported by said apparatus body;
a lens holder rotatably and movably supported by said support shaft, said lens holder holding the objective lens;
moving means for moving said lens holder relative to said apparatus body;
a light receiving member installed substantially symmetrically with said objective lens relative to said support shaft on said lens holder; and
light source generating means for generating a light beam for detecting a position of the objective lens relative to said light receiving member.

8. An optical system driving apparatus according to claim 7, wherein said light source generating means is installed on said apparatus body.

9. An optical system driving apparatus according to claim 7, further comprising shaping means for shaping the light beam generated by said light source generating means, said shaping means being installed on said apparatus body.

10. An optical system driving apparatus according to claim 7, wherein said light receiving member and the objective lens have substantially equal weight.

11. An optical system driving apparatus for moving, in an optical system comprising a plurality of optical components, an objective lens relative to the optical components, said optical system driving apparatus comprising:
an optical system driving apparatus body;
a support shaft being supported by said apparatus body;
a lens holder rotatably and movably supported by said support shaft, said lens holder holding the objective lens;
moving means for moving said lens holder relative to said apparatus body; and
position detecting means for detecting a position of the objective lens, said position detecting means and the objective lens having substantially equal weight and being substantially symmetrically arranged relative to said support shaft on said lens holder.

12. An optical system driving apparatus according to claim 11, further comprising a compensating weight for compensating a difference in weight between the objective lens and said position detecting means, said compensating weight being installed on said lens holder.

13. An optical system driving apparatus according to claim 11, wherein said position detecting means utilizes an electro-magnetic effect for detecting a position of the objective lens.

14. An optical system driving apparatus according to claim 11, wherein said position detecting means utilizes a variation in an electrostatic capacity for detecting a position of the objective lens.

15. An optical system driving apparatus according to claim 11, wherein said position detecting means comprises means for receiving light and for utilizing a variation in light quantity of the received light beam to detect the position of the objective lens.

16. An optical information recording-reproducing apparatus for applying a light beam to an information recording medium by an objective lens to record information on the recording medium and/or to reproduce information recorded on the information recording medium, said apparatus comprising:
an optical system driving apparatus body;
a support shaft being supported by said apparatus body;
a lens holder rotatably and movably supported by said support shaft, said lens holder holding the objective lens;
moving means for moving said lens holder relative to said apparatus body; and
detection elements for detecting position of the objective lens, one of said detection elements and the objective lens being substantially symmetrically arranged relative to said support shaft on said lens holder.

17. An optical information recording-reproducing apparatus according to claim 16, wherein said detection elements comprise a light receiving sensor and light source generating means for detecting the position of the objective lens, said light source generating means being installed on said apparatus body at a position opposite said light receiving sensor, said light receiving sensor and said light source generating means cooperating to detect the objective lens position.

18. An optical information recording-reproducing apparatus according to claim 17, further comprising shaping means for shaping a light beam generated by said light source generating means, said shaping means being mounted on said apparatus body.

19. An optical information recording-reproducing apparatus according to claim 16, wherein said detection elements comprise light source generating means and a light receiving sensor for detecting the position of the objective lens, said light receiving sensor being installed on said apparatus body at a position opposite said light source generating means, said light receiving sensor and said light source generating means cooperating to detect the objective lens position.

20. An optical information recording-reproducing apparatus according to claim 19, further comprising shaping means for shaping a light beam generated by said light source generating means, said lens holder holding said shaping means.

21. An optical information recording-reproducing apparatus according to claim 20, wherein the objective lens and said light source generating means are substantially symmetrically arranged relative to said support shaft, and the objective lens and said shaping means are substantially symmetrically arranged relative to said support shaft.

22. An optical information recording-reproducing apparatus according to claim 20, wherein a sum of the weight of said light source generating means and said shaping means substantially equals the weight of the objective lens.

23. An optical information recording-reproducing apparatus according to claim 20, further comprising a compensating weight for compensating a difference in weight between a sum of the weight of said light source generating means, said shaping means and the objective lens, said lens holder holding said compensating weight.

24. An optical information recording-reproducing apparatus according to claim 17, wherein said light receiving sensor and the objective lens have substantially equal weight.

25. An optical information recording-reproducing apparatus according to claim 16, further comprising a compensating weight for compensating a difference in weight between the objective lens and said one of said detection elements, said lens holder holding said compensating weight.

26. An optical information recording-reproducing apparatus for applying a light beam to an information recording medium by an objective lens to record information on the recording medium and/or to reproduce information recorded on the recording medium, said apparatus comprising:
an optical system driving apparatus body;
a support shaft being supported by said apparatus body;
a lens holder rotatably and movably supported by said support shaft, said lens holder holding the objective lens;
moving means for moving said lens holder relative to said apparatus body; and
a detection device for detecting position of the objective lens, said detection device and said objective lens having substantially equal weight and being substantially symmetrically arranged relative to said support shaft on said lens holder.

27. An optical information recording-reproducing apparatus according to claim 26, further comprising a compensating weight for compensating a difference in weight between the objective lens and said detection device, said lens holder holding said compensating weight.

28. An optical information recording-reproducing apparatus according to claim 26, wherein said detection device utilizes an electro-magnetic effect for detecting the position of the objective lens.

29. An optical information recording-reproducing apparatus according to claim 26, wherein said detection device utilized a variation in electrostatic capacity for detecting the position of the objective lens.

30. An optical information recording-reproducing apparatus for applying a light beam to an information recording medium by an objective lens to record information on the recording medium and/or to reproduce information on the recording medium, said apparatus comprising:

an optical system driving apparatus body;

a support shaft being supported by said apparatus body;

a lens holder rotatably and movably supported by said support shaft, said lens holder holding the objective lens moving means for moving the objective lens relative to said apparatus body; and a detection device for detecting position of the objective lens, said detection device being mounted on said lens holder and functioning as a weight for counterbalancing the weight of the objective lens.

* * * * *

UNITED STATES PATENT AND TRADEMARK OFFICE
CERTIFICATE OF CORRECTION

PATENT NO. : 5,039,202
DATED : August 13, 1991
INVENTOR(S) : Osamu Koyama, et al.

It is certified that error appears in the above-identified patent and that said Letters Patent is hereby corrected as shown below:

COLUMN 1

Line 7, "Aug. 151,988," should read --Aug. 15, 1988,--; and
Line 45, "an" should read --any--.

COLUMN 2

Line 26, "type optical disc apparatus," should read --rewritable type optical disc apparatus,--; and
Line 60, "beamed" should read --beams--.

COLUMN 4

Line 22, "crosssectional view" should read --cross-sectional view--.

UNITED STATES PATENT AND TRADEMARK OFFICE
CERTIFICATE OF CORRECTION

PATENT NO. : 5,039,202
DATED : August 13, 1991
INVENTOR(S) : Osamu Koyama, et al.

It is certified that error appears in the above-identified patent and that said Letters Patent is hereby corrected as shown below:

COLUMN 7

Line 17, ", the" should read --the--; and
Line 28, "shows" should read --show--.

COLUMN 8

Line 16, "shows" should read --show--.

COLUMN 9

Line 15, "an" should read --and--.

COLUMN 14

Line 9, "lens" should read --lens;--.

Signed and Sealed this

Fifteenth Day of June, 1993

Attest:

MICHAEL K. KIRK

*Attesting Officer*    Acting Commissioner of Patents and Trademarks